(12) United States Patent
Ivanak et al.

(10) Patent No.: US 9,997,970 B2
(45) Date of Patent: Jun. 12, 2018

(54) PUMP HAVING A ROTATION PREVENTION MEANS AND DOMESTIC APPLIANCE HAVING A PUMP OF THIS KIND

(71) Applicant: BSH HAUSGERAETE GMBH, Munich (DE)

(72) Inventors: Martin Ivanak, Kosice (SK); Michal Kalavsky, Kosice (SK); Stephan Lutz, Zusamaltheim (DE); Hans-Holger Pertermann, Dresden (DE)

(73) Assignee: BSH Hausgeraete GmbH, Munich (DE)

( * ) Notice: Subject to any disclaimer, the term of this patent is extended or adjusted under 35 U.S.C. 154(b) by 232 days.

(21) Appl. No.: 14/898,826

(22) PCT Filed: Jun. 6, 2014

(86) PCT No.: PCT/EP2014/061845
§ 371 (c)(1),
(2) Date: Dec. 16, 2015

(87) PCT Pub. No.: WO2014/202411
PCT Pub. Date: Dec. 24, 2014

(65) Prior Publication Data
US 2016/0149449 A1   May 26, 2016

(30) Foreign Application Priority Data
Jun. 19, 2013   (DE) .................. 10 2013 211 573

(51) Int. Cl.
*H02K 9/00* (2006.01)
*H02K 21/12* (2006.01)
(Continued)

(52) U.S. Cl.
CPC ............. *H02K 1/28* (2013.01); *F04D 13/064* (2013.01); *H02K 1/2706* (2013.01);
(Continued)

(58) Field of Classification Search
CPC .................................. H02K 1/27; H02K 1/28
(Continued)

(56) References Cited

U.S. PATENT DOCUMENTS 5,121,020 A * 6/1992 Bertram ............... H02K 1/2726
                                                    310/156.11
8,146,234 B2   4/2012 Marioni
(Continued)

FOREIGN PATENT DOCUMENTS

DE    102004034176 A1   2/2006
EP        1427087 A1    6/2004
(Continued)

OTHER PUBLICATIONS

Machine Translation JP 10327547 (1998).*

*Primary Examiner* — Jose Gonzalez Quinone
(74) *Attorney, Agent, or Firm* — Laurence A. Greenberg; Werner H. Stemer; Ralph E. Locher

(57) ABSTRACT

A pump has a DC pump drive motor with an electrically driven stator winding and a rotor which is mounted such that it can be driven in rotation in the field of the stator winding. The motor also has a motor shaft, a permanent-magnet ring and a holder which is mounted on the motor shaft and on which the permanent-magnet ring is held. The pump has a rotation-prevention device configured to secure the permanent-magnet ring against rotation about the axis of the rotor on the holder. A domestic appliance, in particular a dishwasher or a washing machine, is provided with a pump of this kind.

12 Claims, 6 Drawing Sheets

(51) Int. Cl.
*H02K 1/28* (2006.01)
*H02K 1/27* (2006.01)
*H02K 5/12* (2006.01)
*F04D 13/06* (2006.01)

(52) U.S. Cl.
CPC ............ *H02K 1/2733* (2013.01); *H02K 5/12* (2013.01); *F05D 2260/30* (2013.01)

(58) Field of Classification Search
USPC ............ 310/156.01, 156.08, 156.11, 156.12, 310/156.22, 156.38
See application file for complete search history.

(56) References Cited

U.S. PATENT DOCUMENTS

| | | | |
|---|---|---|---|
| 9,048,715 B2 | 6/2015 | Kodani et al. | |
| 2009/0202372 A1* | 8/2009 | Marioni | H02K 5/128 |
| | | | 417/423.11 |
| 2011/0062812 A1 | 3/2011 | Horng et al. | |
| 2013/0069469 A1* | 3/2013 | Kodani | H02K 1/2733 |
| | | | 310/156.38 |
| 2013/0266462 A1* | 10/2013 | Bernreuther | H02K 1/145 |
| | | | 417/420 |

FOREIGN PATENT DOCUMENTS

| | | | |
|---|---|---|---|
| EP | 1788690 A1 | 5/2007 | |
| EP | 2573917 A2 | 3/2013 | |
| JP | 10327547 A | * 12/1998 | |

* cited by examiner

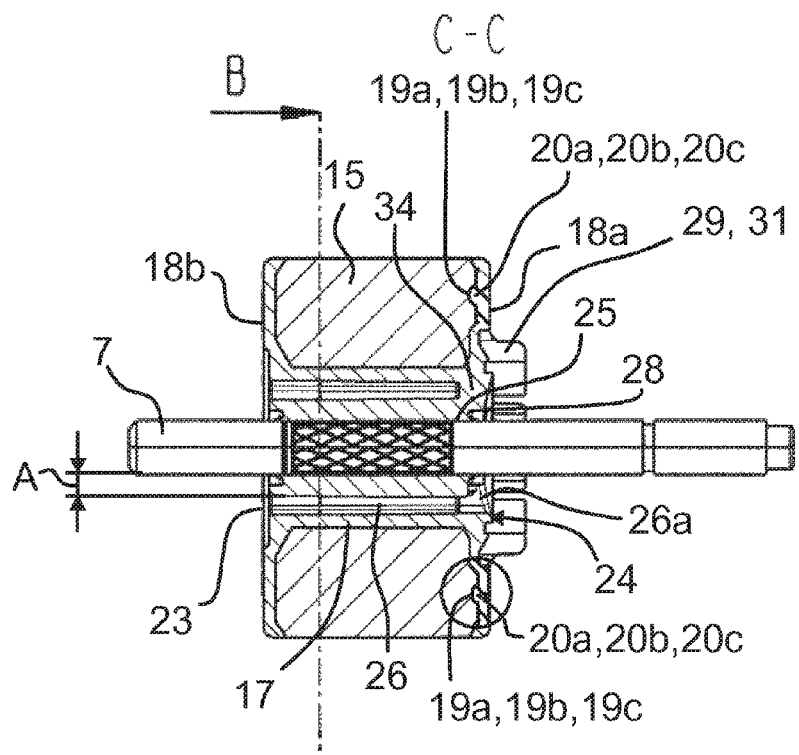
*Fig. 3a*
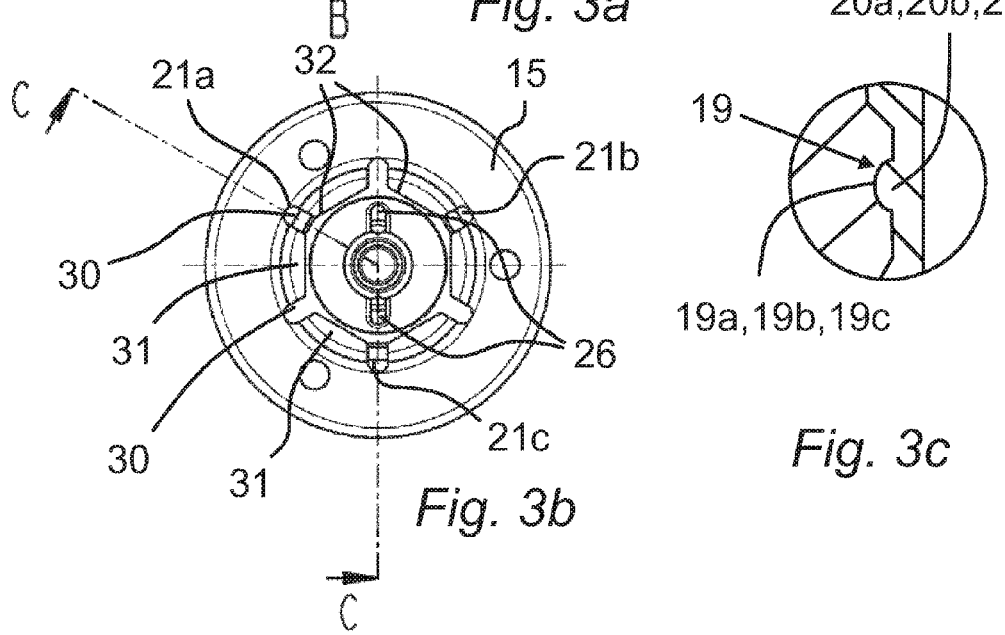
*Fig. 3b*
*Fig. 3c*

PUMP HAVING A ROTATION PREVENTION MEANS AND DOMESTIC APPLIANCE HAVING A PUMP OF THIS KIND

BACKGROUND OF THE INVENTION

Field of the Invention

The invention relates to a pump having a DC pump drive motor with an electrically controllable stator winding and a rotor which is mounted such that it can be driven in rotation in the field of the stator winding, and which has a motor shaft, a permanent-magnet ring and a holder, which is mounted on the motor shaft and on which the permanent-magnet ring is held, and to a domestic appliance, in particular dishwasher or washing machine, having a pump of this kind.

EP 1 788 690 A1 describes a method for manufacturing a permanent-magnet rotor for a synchronous motor, in particular for a pump of a washing machine for industrial and private use and suchlike, having an external stator comprising a cylindrical central core with an axis and an axial passage, which is surrounded by a plurality of permanent magnets, which have an outer arched area and an inner arched area and lateral edges, comprising the steps of arranging a bowl-type element made of a plastic material comprising a base end, an open end, a side wall and a plurality of longitudinally extending recesses, which are embodied in the side wall and define positioning receptacles for a positioning of the magnets; introducing the central core into the bowl-type element and arranging the magnets to conform with the positioning receptacles; injecting a plastic material into and around the bowl-type element so as to conform with the recesses, wherein a cage-type structure with opposing bases and stays, which extend between the opposing bases, is achieved, wherein the opposing bases adjoin the ends of the bowl-type element and the stays are received in the recesses.

EP 1 427 087 A1 describes a rotor for an electric motor, at each of the two axial ends of which a cover disk is arranged, wherein an attachment for an axial bearing is embodied on a cover disk in one piece herewith and a stop ring aligned outwards in the axial direction is embodied on the other cover disk in one piece therewith. A sleeve surrounding the rotor shaft and connecting the cover disks to one another is provided in the interior of the rotor. Projections projecting axially outwards are embodied on the two cover disks, said projections serving as turbulence units or turbulence elements. These turbulence elements provide for a circulation of the liquid, which improves the ventilation of the rotor housing in the case of a wet running electric motor, since the air can also be flushed out of the boundary areas of a rotor housing by means of the movement of the fluid.

BRIEF SUMMARY OF THE INVENTION

The object of the invention is to create a pump, in particular a domestic appliance with a pump of this kind, which is cost-effective and in particular has an improved service life and/or an improved degree of efficiency.

The object of the invention is achieved by a pump, having a DC pump drive motor with an electrically controllable stator winding and a rotor which is mounted such that it can be driven in rotation in the field of the stator winding and which has a motor shaft, a permanent-magnet ring and a holder, which is mounted on the motor shaft and on which the permanent-magnet ring is held, wherein the pump has a rotation prevention means which is embodied to secure the permanent-magnet ring against rotation about the axis of the rotor on the holder.

A cost-effective pump can be created by the rotor being substantially formed solely from the components of the motor shaft, the holder and the permanent-magnet ring. The holder essentially serves to mount the permanent-magnet ring on the motor shaft. Since the permanent-magnet ring has an annular basic shape and the permanent-magnet ring is fixed to the holder in coaxial alignment with the motor shaft, there is the general risk that on account of the rotation of the rotor driven during operation of the pump, the permanent-magnet ring can detach from the holder in the direction of rotation and can thus overrun. An unwanted detachment of the permanent-magnet ring from the holder can be prevented by the pump having a rotation prevention means, which is embodied to secure the permanent-magnet ring against rotation about the axis of the rotor on the holder.

The rotation prevention means can be formed of at least one securing projection which engages in a form-fit manner into at least one securing recess in each instance. An additional form-fit connection between the permanent-magnet ring and the holder is established by means of such a pairing of the securing recess and the securing projection, said connection being able in particular to reliably prevent a rotation of the permanent-magnet ring on the holder.

The at least one securing recess and the respective at least one assigned securing projection can be arranged, in particular embodied, on the holder and on the permanent-magnet ring in each instance. Alternatively or in addition, the at least one securing recess and the respective at least one assigned securing projection can be arranged, in particular embodied, on the permanent-magnet ring and on the holder in each instance. As a result, the holder and the permanent-magnet ring can gear into each other in a form-fit manner.

In all embodiments, two, in particular three or more pairs of securing recesses and securing projections can be embodied on the rotor distributed at equal intervals over a periphery. By two, in particular three or more pairs of securing recesses and securing projections being provided on the rotor distributed at equal intervals over a periphery, the permanent-magnet ring can be fixed to the holder in several different angular positions. Moreover, two, in particular three or more pairs of securing recesses and securing projections can ensure a better form-fit fixing than just one single pair of securing recess and securing projection.

In order to form a drum-shaped receptacle for the permanent-magnet ring, the holder may have a circular ring-cylindrical sleeve segment which is permanently connected to the motor shaft and two circular disks laterally delimiting the permanent-magnet ring can be arranged on axially opposing front faces of the sleeve segment, of which circular disks at least one circular disk has a circular disk wall facing the permanent-magnet ring, which has the at least one securing recess and/or the at least one securing projection. Conversely, the permanent-magnet ring can have the at least one corresponding securing recess and/or the at least one corresponding securing projection on at least one annular front wall, which faces one of the circular disks of the holder. The circular disks of the holder delimit the permanent-magnet ring from two axial front sides and in this respect firstly only fix the permanent-magnet ring in the axial direction. Without a rotation prevention means, the permanent-magnet ring is only fixed to the holder against rotation in a force-fit or material-bonded manner. By at least one circular disk having a circular disk wall facing the permanent-magnet ring, said circular disk having the at least one securing recess and/or the at least one securing projection, an additional form-fit mounting is established, which in particular prevents the rotation of the permanent-magnet ring on the drum-shaped receptacle.

The securing recess can be formed of a half-lens-shaped depression in the permanent-magnet ring, in particular in an annular front wall of the permanent-magnet ring, and the securing projection can be formed of a corresponding half-lens-shaped projection on the holder, in particular on a circular disk wall of the at least one circular disk facing the permanent-magnet ring. By the permanent-magnet ring in particular being provided with such half-lens-shaped depressions and/or half-lens-shaped projections, sharp edges and/or corners can be avoided in the surface of the permanent-magnet ring. Since sharp edges and/or corners in the surface of the permanent-magnet ring cause or at least promote cracking, it is particularly wise to avoid edges and/or corners in the case of the generally rather brittle materials that can be used for the permanent-magnet ring, in order to prevent cracking or avoid it occurring or be able to delay it spreading. As a result, despite the formation of depressions and/or projections on the permanent-magnet ring, waste can be prevented or reduced during manufacture, and the service life of the permanent-magnet ring and consequently the entire pump can be extended during operation.

In additional embodiments, the pump can have a drive motor with an electrically controllable stator winding and a rotor which is mounted such that it can be driven in rotation in the field of the stator winding in a wet space of the drive motor, and which has a motor shaft, a rotor magnet and a holder, which is mounted on the motor shaft and on which the rotor magnet is held, and the holder comprises a sleeve segment extending between the motor shaft and the rotor magnet, said sleeve segment having at least one flow duct, which is embodied to transport liquid disposed in the wet space through the holder, in which pump the at least one flow duct extends at a radial distance from the motor shaft completely in the interior of the sleeve segment.

The liquid disposed in the wet space serves inter alia to cool and/or lubricate the rotor or the bearing of the rotor. In order to achieve a high electromagnetic degree of efficiency, the outer casing wall of the rotor, i.e. of the rotor magnet is brought structurally as close as possible to the stator winding. This results in only a very small gap being present between the rotor or rotor magnet and the inner wall of the wet space, it being possible for liquid to only pass through said gap very inadequately particularly during a rotation of the rotor. In this respect, an area of wet space facing away from a liquid inlet can only be very inadequately flushed through by way of this gap alone. In particular, in such a rear area of wet space, i.e. one facing away from the pump wheel, air and/or steam bubbles accumulate undesirably. On account of the rotation of the rotor, air and/or steam bubbles tend to accumulate in the center of the wet space near to the axis in proximity to the motor shaft and not in an outer periphery in proximity to the gap. The at least one inventive flow duct can be used to circulate the liquid through the holder and air and/or steam bubbles can in particular be guided outwards, so that there is no risk of the bearing of the rotor running dry, which would reduce the service life of the pump and the degree of efficiency of the pump. By removing air and/or steam bubbles, the drive motor and thus also the pump also run more quietly.

By the at least one flow duct extending at a radial distance from the motor shaft completely in the interior of the sleeve segment, no liquid can wet the motor shaft in the area in which the holder rests on the motor shaft. As a result, corrosion in this area can be prevented or at least reduced for instance. An avoidance of corrosion is particularly important in the area in which the holder rests on the motor shaft, if in order to improve fixing of the holder on the motor shaft, the motor shaft has a knurl on its surface, which weakens the motor shaft and renders it prone to corrosion. This is then of particular significance if the liquid is a chemically active washing liquor of a dishwasher for instance. If the at least one flow duct extends at a radial distance from the motor shaft completely in the interior of the sleeve segment, the holder can also rest entirely on the motor shaft, i.e. the holder has contact with the casing wall of the motor shaft over the largest possible area, as a result of which the holder can be fixed particularly permanently and reliably to the motor shaft and in this respect an unwanted detachment of the holder from the motor shaft is prevented or the risk of such a detachment is at least significantly reduced. Instead of a single flow duct, two or even multiple flow ducts can in particular be embodied in the holder.

The following features can be used individually or in combination with one another in different embodiments: In general the drive motor may be a brushless DC wet-running pump drive motor. The rotor magnet can in general be a permanent-magnet ring, which is mounted on the holder. The at least one flow duct can be embodied to transport liquid disposed in the wet space from a first front end of the holder to an axially opposing second front end of the holder. The sleeve segment may in particular have an inner casing wall, which completely surrounds the motor shaft over its periphery. In this respect, the sleeve segment can rest over the entire surface of the motor shaft.

The at least one flow duct may have a circumferentially closed-walled duct wall. The closed-walled duct wall can be formed entirely from the material of the sleeve segment of the holder. In these two alternative or additional embodiments, it is ensured that liquid can be transported through the flow duct without leakage. In this respect, there is no need to seal possible gaps. There is thus also no risk of liquid undesirably being able to escape from the flow duct, which could wet the motor shaft in the area in which the holder rests on the motor shaft.

The wall thickness of a sleeve inner wall of the sleeve segment lying within the periphery of the at least one flow duct can be larger in one special embodiment of the invention than the wall thickness of a sleeve outer wall of the sleeve segment lying outside of the periphery of the at least one flow duct. In other words, the periphery over which the at least one flow duct lies divides the sleeve segment into a sleeve-shaped outer wall segment and a similarly sleeve-shaped inner wall segment. Here the inner wall segment has a larger wall thickness than the outer wall segment. By the wall thickness of the sleeve inner wall being larger than the wall thickness of the sleeve outer wall, a stable fit of the holder on the motor shaft can be ensured. By the wall thickness of the sleeve outer wall being smaller than the wall thickness of the sleeve inner wall, the at least one flow duct is closer to the rotor magnet, which may in general be a permanent-magnet ring, so that a cooling of the rotor magnet or the permanent-magnet ring by the liquid flowing through the at least one flow duct can be improved.

In all embodiments, the at least one flow duct can have a flow duct end segment which extends in the cross-section at least on the outlet side. Here a flow duct which is cross-sectionally circular in the area of the flow duct end segment can pass into a rather oval and/or arched flow duct for instance. By the at least one flow duct having a flow duct end segment extending in the cross-section at least on the outlet side, the escaping liquid can be discharged better and if necessary also better distributed on the axial bearing. The liquid can pass at least predominantly or even completely through a central opening, in particular an annular gap between the axial bearing and the motor shaft and can be fed back via one of the further bearings of the motor shaft to the pump wheel.

In this respect, in all embodiments the at least one flow duct can open in particular on the outlet side onto a front wall of a bearing seat embodied on the holder, in which a sliding or roller bearing, in particular an axial bearing is held, which is embodied to mount the rotor rotatably in respect of the stator winding.

The bearing seat can moreover have a number of projections distributed evenly over a periphery and at a distance from one another in order to form flow passages, said projections extending away from the front wall of the holder in the axial direction. The bearing seat can be embodied here in the manner of a crown-shaped holder. The projections can be formed in segments by forming the flow passages from a peripheral circular ring-shaped wall of the holder. The holder can generally be manufactured as an in particular one-piece plastic injection-molded part.

The projections can have inner surfaces facing the bearing, in particular axial bearing, which are embodied flat so as to rest against the bearing, in particular axial bearing, with line contact. In this respect, the inner surfaces of the projections can form a polygonal line as a bearing surface, so that a circular ring-shaped bearing rests against this polygonal line, i.e. against the inner surfaces of the projections, with line contact.

The sleeve segment can generally have a number of axially longitudinally extending blind hole-shaped recesses which are evenly distributed over a periphery. These recesses can have a circular ring segment-shaped contour in the cross-section. The blind hole-shaped recesses can reduce the quantity of material and consequently the weight of the holder. Moreover, in the case of a holder manufactured using a plastic injection molding method, shrink hole depressions and pock marks which may result during the cooling and shrinking of the plastic material of the holder can be prevented or at least avoided. Moreover, in a special embodiment, the blind hole-shaped recesses may form or at least help to form the flow ducts. In this respect, the at least one flow duct, in particular two or more flow ducts can be formed by a recess in each case, the closed front wall of which forming the blind hole-shaped recess is embodied to be open. The closed front wall is in this respect replaced by the flow duct end segment which extends in the cross-section.

The rotor can be embodied as a permanent-magnet inner rotor and formed of a single-piece ring made of an anisotropic ferromagnetic material, which is magnetized in a multi-pole manner.

The permanent-magnet ring can be magnetized in a multi-pole manner, such that each pole pair in the cross-section of the permanent-magnet ring takes up a circular ring sector, such that the magnetic field lines extend radially inwards starting from the outer casing wall of the permanent-magnet ring, run in an arched manner within the respective sector close to the inner casing wall of the permanent-magnet ring and then extend radially outwards again in the direction of the outer casing wall of the permanent-magnet ring.

The permanent-magnet ring can be magnetized for instance with four or six pole pairs, which are arranged in sectors of the same size distributed evenly over the periphery of the ring.

In the embodiments in which the holder has circular disks, at least one of the circular disks can have a bearing seat, in which a sliding or roller bearing, in particular axial bearing, is held, which is embodied to mount the permanent-magnet inner rotor in a rotatable manner in respect of the stator winding. The bearing seat may have a base surface, the surface of which facing the bearing is spherical, in particular concave-spherical.

Alternatively or in addition to a spherical base surface, the bearing seat can have a number of projections distanced from one another and distributed evenly over the periphery of an outer ring, said projections extending away from an outer wall of at least one of the circular disks in the axial direction and the inner surfaces of which facing the bearing are embodied to be flat in order to rest against the outer ring of the bearing with line contact.

In all embodiments the permanent-magnet ring can have at least one, in particular three or more positioning notches, which are embodied to securely hold the permanent-magnet ring against rotation during a magnetization process in a magnetization apparatus.

In very general terms, the DC pump drive motor can generally be embodied as a wet-running motor through which liquid is passed and the permanent-magnet ring of the permanent-magnet inner rotor is in direct contact with the liquid here.

The invention also relates to a domestic appliance, in particular a dishwasher or a washing machine, which has an inventive pump, as described.

One exemplary embodiment of the invention is shown by way of example in the appended schematic drawings, in which:

BRIEF DESCRIPTION OF THE SEVERAL VIEWS OF THE DRAWING

FIG. 3a shows a longitudinal section along the line of intersection C-C according to FIG. 3b through the permanent-magnet inner rotor according to FIG. 2 in an assembled state;

FIG. 3b shows a top view in the axial direction onto the permanent-magnet inner rotor according to FIG. 3a;

FIG. 3c shows an enlarged cutout from FIG. 3a in the region of a rotation prevention means;

FIG. 4 shows a cross-sectional view through the permanent-magnet inner rotor along the line of intersection B-B according to FIG. 3a;

DESCRIPTION OF THE INVENTION

Figure 1:
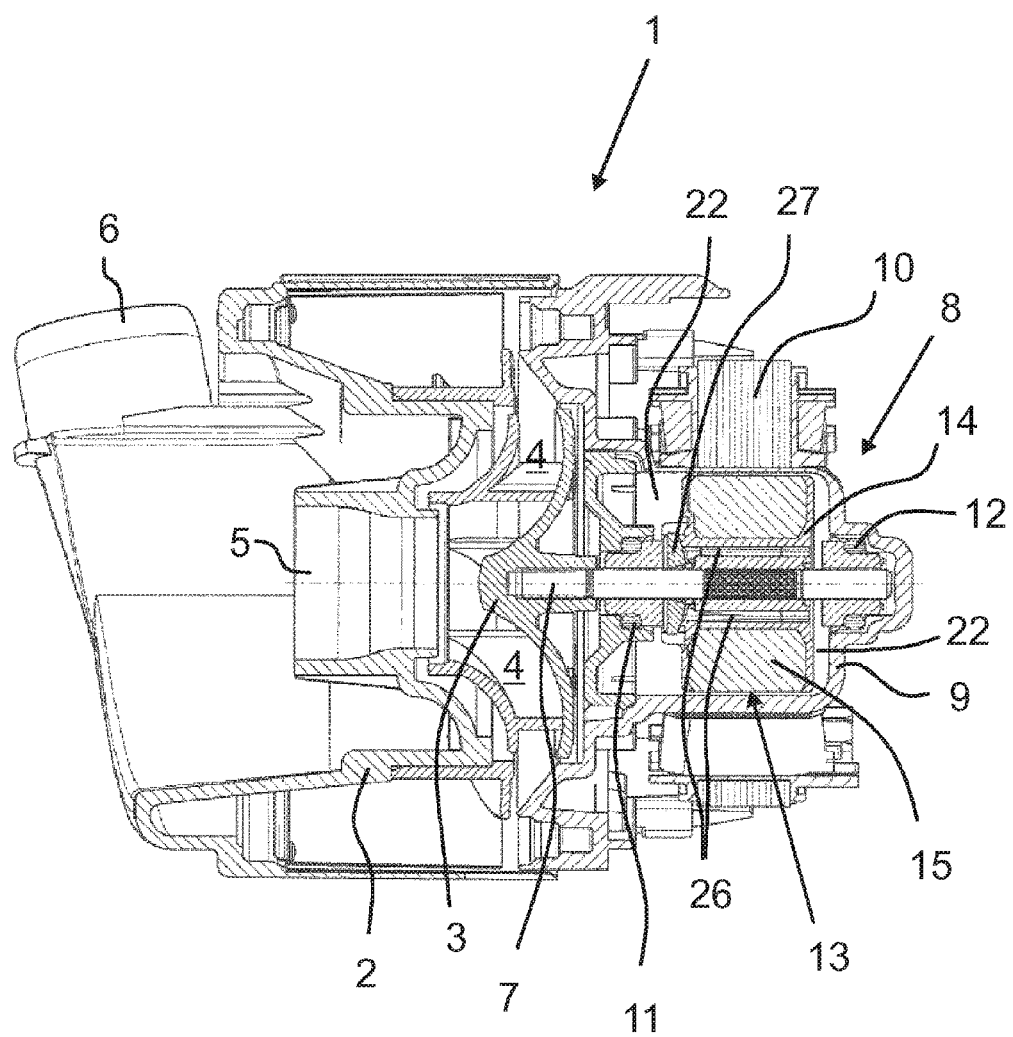
FIG. 1 shows a cross-sectional view of an exemplary pump of a domestic appliance with an inventive DC wet-running pump drive motor.

A pump 1 of a domestic appliance shown by way of example in FIG. 1 has a pump housing 2, in which a pump wheel 3 is rotatably arranged. The pump wheel 3 has a number of blades 4, which are embodied and arranged so as to take in liquid axially via an inlet opening 5 and radially discharge the same via an outlet opening 6. In the present exemplary embodiment, the pump 1 consequently forms a rotary pump of a radial pump design. The pump wheel 3 rests in a torsion-resistant manner on a motor shaft 7 of a brushless DC wet-running pump drive motor B.

The DC wet-running pump drive motor 8 is arranged in a motor housing 9. The motor housing 9 is directly connected to the pump housing 2 in the case of the present exemplary embodiment. If necessary the motor housing 9, together with the pump housing 2, can form one structural unit or even be embodied in one piece therewith. The DC wet-running pump drive motor 8 has an electrically controllable stator winding 10 and a rotor 13 which can be driven in the field of the stator winding 10 and is rotatably mounted by means of the motor shaft 7 in the field between two opposing bearings 11, 12.

The DC wet-running pump drive motor 8 of the exemplary embodiment shown is embodied as a wet-running motor through which liquid passes, in which the rotor 13 within a motor housing 9 is mounted in a wet space 22, which is flushed through with liquid from the pump housing 2. The stator winding 10 is arranged here in the dry surrounding area outside of the motor housing 9.

In the exemplary embodiment shown, the rotor 13 essentially has the motor shaft 7, a holder 14 mounted in a torsion-resistant manner on the motor shaft 7 and a torsion-resistant permanent-magnet ring 15 mounted axially on the holder 14.

Figure 2:
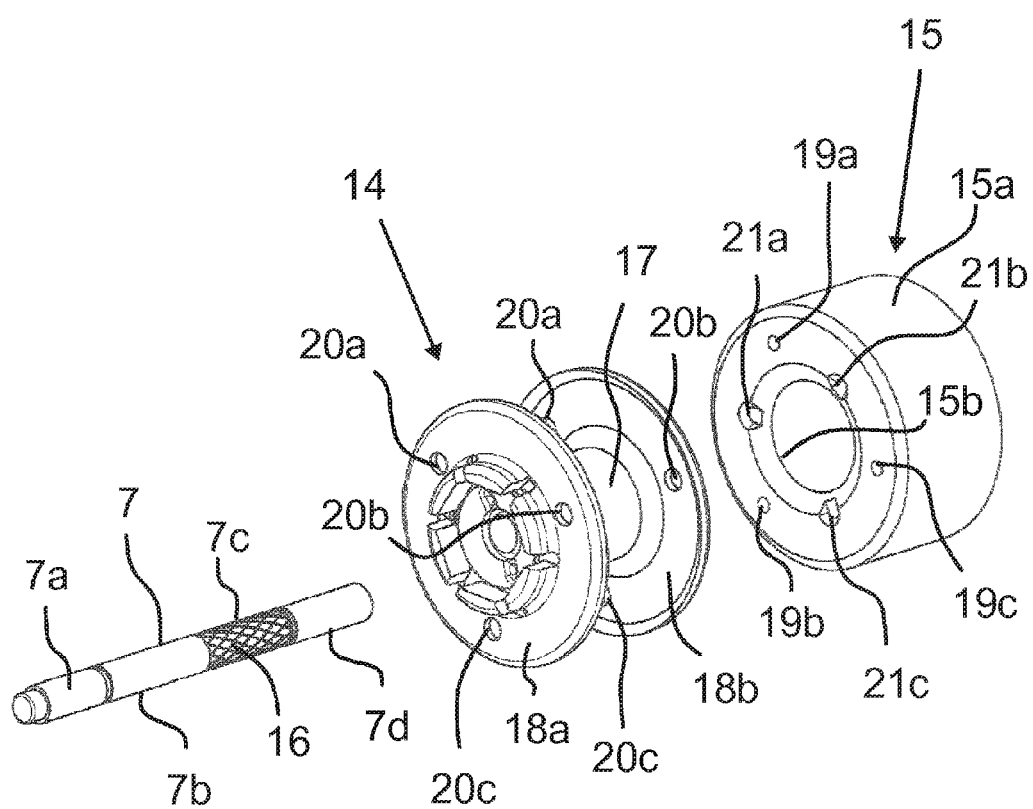
FIG. 2 shows a perspective exploded view of an inventive permanent-magnet inner rotor of the DC wet-running pump drive motor according to FIG. 1.

This permanent-magnet inner rotor is shown in more detail in an exploded view in FIG. 2.

The motor shaft 7 has a front shaft end 7a on which the pump wheel 3 is to be mounted. In a central segment 7c, the motor shaft 7 has a knurl 16 on its outer casing wall, which is embodied to mount the holder 14 in a torsion-proof manner on the motor shaft 7. Bearing surface segments 7b, 7d form seats for the shaft bearings 11, 12 and an axial bearing 27, which are embodied to rotatably mount the motor shaft 7 in the motor housing 9.

The permanent-magnet ring 15 of the rotor 13 is in direct contact with the liquid in the wet space 22 (FIG. 1). The rotor 13 has a single-piece permanent-magnet ring 15 made of an anisotropic ferromagnetic material, which is magnetized in a multi-pole manner.

Figure 6A:
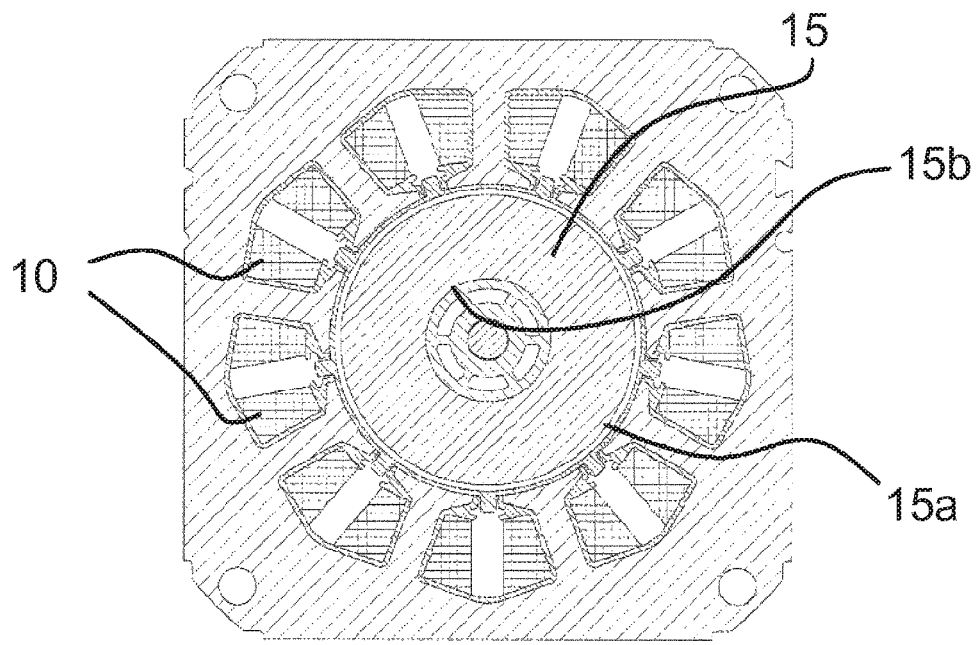
FIG. 6a shows a cross-sectional view through the DC wet-running pump drive motor with the permanent-magnet inner rotor mounted rotatably in the field of the stator winding.
Figure 6B:
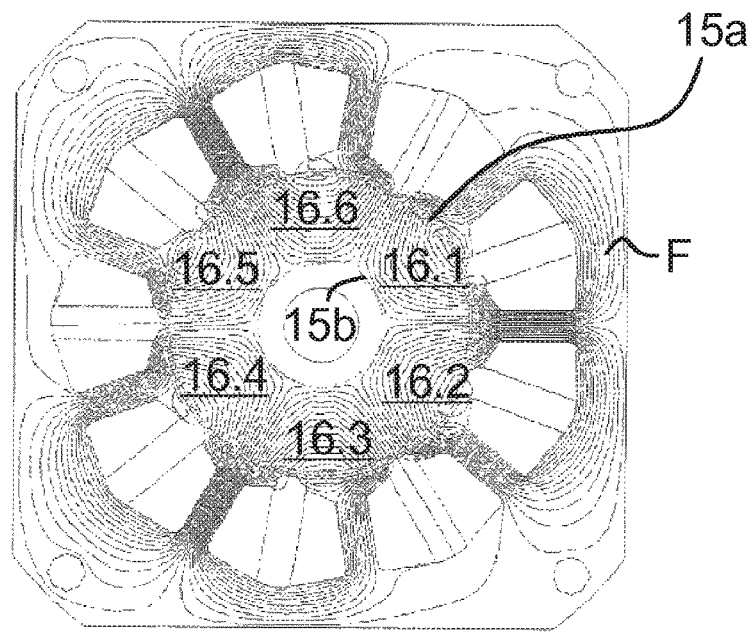
FIG. 6b shows a schematic representation of the magnetic field lines in the cross-section through the DC wet-running pump drive motor with the permanent-magnet inner rotor according to FIG. 6a mounted rotatably in the field of the stator winding.

The permanent-magnet ring 15 is magnetized in a multi-pole manner such that each pole pair 16.1 to 16.6, as shown schematically in FIGS. 6a and 6b, assumes a circular ring sector in the cross-section of the permanent-magnet ring 15, such that the magnetic field lines F extend radially inwards starting from an outer annular wall 15a of the permanent-magnet ring 15, run in an arched manner within the respective sector close to an inner annular wall 15b of the permanent magnet ring 15 and then extend radially outwards again in the direction of the outer annular wall 15a of the permanent magnet ring 15, as shown in particular in FIG. 6b. In the exemplary embodiment shown, the permanent-magnet ring 15 can be magnetized with six pole pairs 16.1 to 16.6, which are arranged in sectors of the same size distributed evenly over the periphery of the ring. The permanent-magnet ring 15 can however also be embodied for instance with four or eight pole pairs.

As shown in particular in FIG. 2 and FIG. 3a, the holder 14 has a circular ring-cylindrical sleeve segment 17 in order to form a drum-shaped receptacle for the permanent magnet ring 15, said sleeve segment being permanently connected to the motor shaft 7. Two circular disks 18a, 18b are arranged on axially opposing front faces of the sleeve segment 17, said circular disks having a larger outer diameter in each case than the sleeve segment 17, so that the permanent-magnet ring 15 is held in an axially fixed manner by the circular disks 18a, 18b between the circular disks 18a, 18b.

In the case of the exemplary embodiment shown in FIGS. 3a to 3c, the permanent-magnet ring 15 has three rotation prevention means 19 in the form of securing recesses 19a, 19b, 19c, which are embodied to engage in corresponding securing projections 20a, 20b, 20c, which are embodied on at least one of the two circular disks 18a, 18b of the holder 14, in order to fix the permanent-magnet ring 15 in a torsion-proof manner on the holder 14 in a position so as to gear into one another.

Each securing recess 19a, 19b, 19c is formed in the exemplary embodiment shown by a half-lens-shaped depression in an annular front wall in the permanent-magnet ring 15. Each securing projection 20a, 20b, 20c is formed here by a corresponding half-lens-shaped projection on the holder 14, in particular on a circular disk wall of the at least one circular disk 18a, 18b facing the permanent-magnet ring 15. By the permanent-magnet ring 15 in particular being provided with such half-lens-shaped depressions, sharp edges and/or corners can be avoided in the surface of the permanent-magnet ring 15.

In addition, in the case of the exemplary embodiment shown, the permanent-magnet ring 15 has three positioning notches 21a, 21b, 21c, which are embodied to securely hold the permanent-magnet ring 15 against rotation during a magnetization process in a magnetization apparatus (not shown).

In the case of the present exemplary embodiment, the sleeve segment 17 has two flow ducts 26. The two flow ducts 26 are arranged opposite one another, i.e. arranged offset by 180 degrees in respect of each other over a shared periphery, as shown in particular in FIG. 3b and FIG. 4. Each flow duct 26 is embodied to transport liquid disposed in the wet space 22 from a first front end 23 of the holder 14 to an axially opposing second front end 24 of the holder 14. Each flow duct 26 extends in parallel to the axial length of the motor shaft 7. The sleeve segment 17 has an inner casing wall 25, which adjoins the motor shaft 7 over its periphery completely enclosing the motor shaft 7, as shown in particular also in FIG. 4. Each flow duct 26 extends here at a radial distance A from the motor shaft 7 completely in within the interior of the sleeve segment 17. Each flow duct 26 here has a circumferential closed-walled duct wall. The closed-walled duct wall is formed entirely from the material of the sleeve segment 17 of the holder 14.

Figure 4:
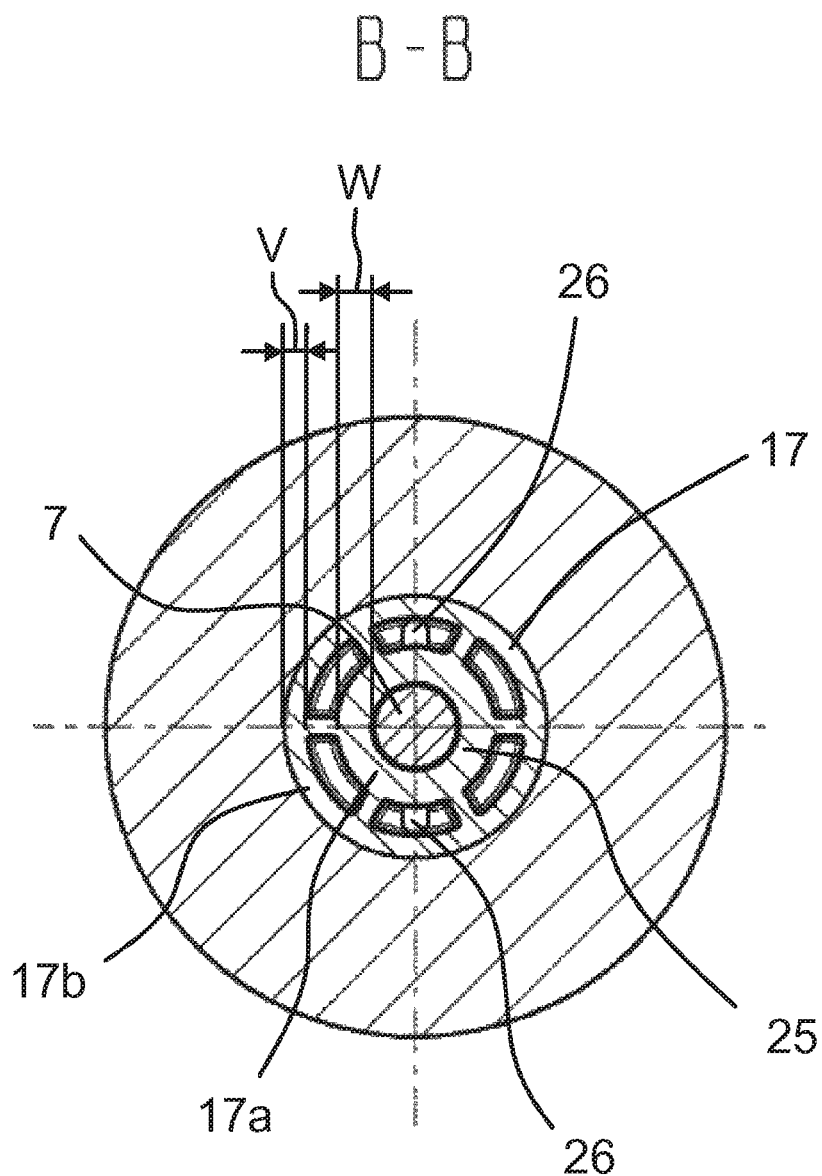

In the case of the present exemplary embodiment of the invention, the wall thickness W of a sleeve inner wall 17a of the sleeve segment 17 disposed within the periphery of the at least one flow duct 26, as shown in FIG. 4, is larger than the wall thickness V of a sleeve outer wall 17b of the sleeve segment 17 disposed outside of the periphery of the at least one flow duct 26.

FIG. 3a shows to the right below the motor shaft 7 that the flow duct 26 shown has a flow duct end segment 26a which extends in the cross-section on the outlet side.

Figure 5:
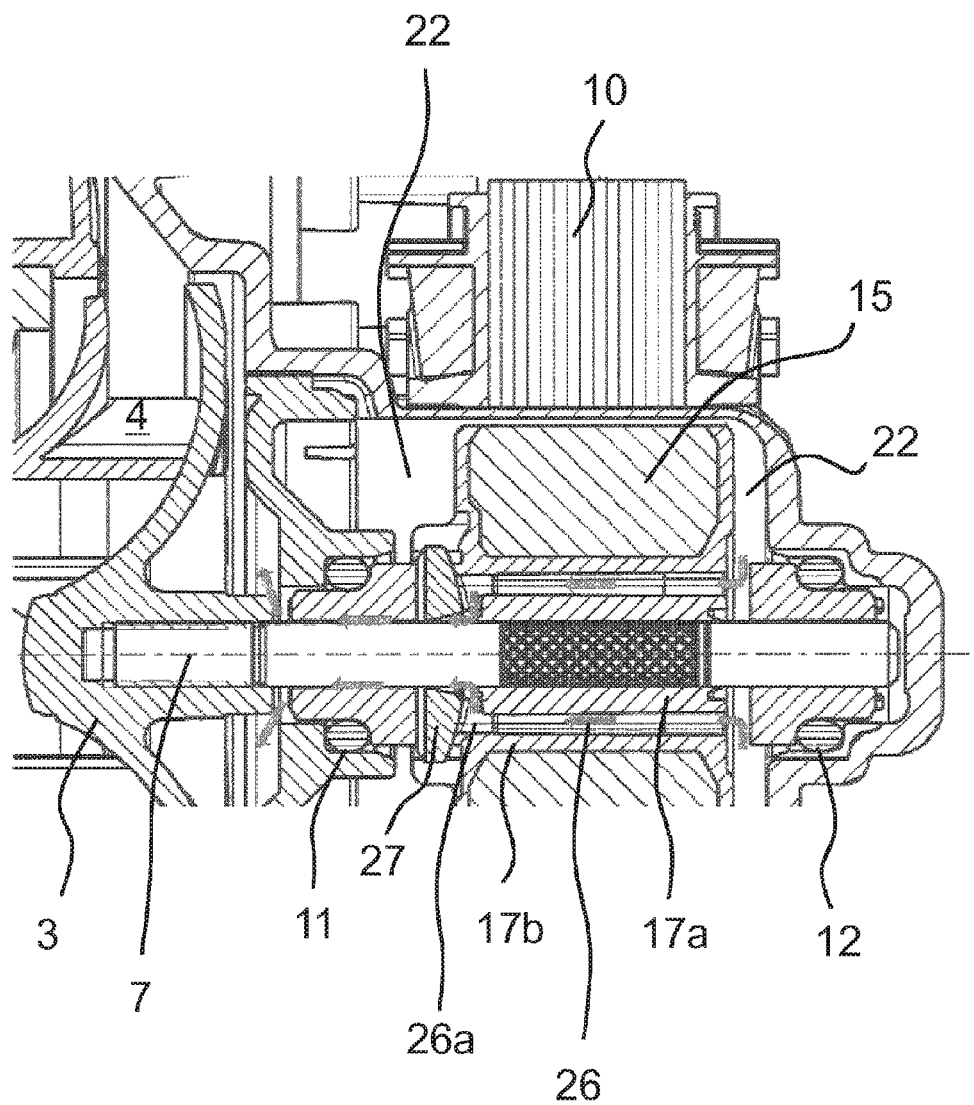
FIG. 5 shows an enlarged partial cross-sectional view of the exemplary pump in the area of an inventive holder of the permanent-magnet inner rotor according to FIG. 3a with a display of inventive flow ducts.

The flow ducts 26 open in particular on the outlet side (see arrow in FIG. 5) on a front wall 28 of a bearing seat 29 embodied on the holder 14, in which the axial bearing 27 is mounted. The bearing seat 29 has a number of projections 31 distributed evenly over a periphery and at a distance from one another in order to form flow passages 30, said projections extending away from the front wall 28 of the holder 14 in the axial direction. The projections 31 have inner surfaces 32 facing the axial bearing 27, which are embodied flat so as to rest against the axial bearing 27 with line contact.

The sleeve segment 17 has a number of axially longitudinally extending blind hole-shaped recesses 33 which are distributed evenly over a periphery. The recesses 33 have a circular ring segment-shaped contour in the cross-section.

Each flow duct 26 is formed by a recess 33 in each case, the closed front wall 34 of which forming the blind hole-shaped recess 33 is embodied to be open. The closed front wall 34 is in this respect replaced by the flow duct end segment 26a extending in the cross-section.

LIST OF REFERENCE CHARACTERS 1 pump
2 pump housing
3 pump wheel
4 blades
5 inlet opening
6 outlet opening
7 motor shaft
7a front shaft end
7b, 7d bearing surface segments
7c central segment
8 DC pump drive motor
9 motor housing
10 stator winding
11, 12 bearings
13 rotor
14 holder
15 permanent-magnet ring
15a outer annular wall
15b inner annular wall
16.1 to 16.6 pole pair
17 sleeve segment
17a sleeve inner wall
17b sleeve outer wall
18a, 18b circular disks
19 rotation prevention means
19, 19a, 19b, 19c securing recesses
20a, 20b, 20c securing projections
21a, 21b, 21c positioning notches
22 wet space
23 first front end
24 second front end
25 inner casing wall
26 flow duct
27 axial bearing
28 front wall
29 bearing seat
30 flow passages
31 projections
32 inner surfaces
33 blind hole-shaped recesses
34 closed front wall
F field lines
a radial distance
w larger wall thickness
V smaller wall thickness

The invention claimed is:

1. A pump, comprising:
    a DC pump drive motor with an electrically driven stator winding and a rotor mounted to be driven in rotation in a field of said stator winding;
    a motor shaft;
    a holder mounted on said motor shaft and a permanent-magnet ring held on said holder;
    a rotation prevention device configured to secure said permanent-magnet ring against rotation about an axis of said rotor on said holder;
    said rotation prevention device being formed of at least one securing projection engaging with a form-fit into at least one securing recess in each instance, said securing recess being a half-lens-shaped depression formed in said permanent-magnet ring, and said securing projection being a corresponding half-lens-shaped projection formed on said holder.

2. The pump according to claim 1, wherein the at least one securing recess is a half-lens-shaped depression formed in a ring face of said permanent-magnet ring and the respective at least one assigned securing projection is a half-lens-shaped projection on a circular disk wall of a circular disk facing said permanent-magnet ring.

3. The pump according to claim 1, wherein said at least one securing recess is formed of two pairs of securing recesses and said at least one securing projection is formed of two pairs of securing projections embodied on said rotor and distributed equidistantly over a circumference thereof.

4. The pump according to claim 1, wherein said at least one securing recess is formed of three or more pairs of securing recesses and said at least one securing projection is formed of three or more pairs of securing projections embodied on said rotor and distributed equidistantly over a circumference thereof.

5. The pump according to claim 1, wherein said holder, for forming a drum-shaped receptacle for said permanent-magnet ring, comprises a circular ring-cylindrical sleeve segment that is permanently connected to said motor shaft and wherein two circular disks laterally delimiting said permanent-magnet ring are arranged on axially opposing front faces of said sleeve segment, of which circular disks at least one circular disk has a circular disk wall facing said permanent-magnet ring, which has said at least one securing recess and/or said at least one securing projection.

6. The pump according to claim 5, wherein said permanent-magnet ring is formed with said at least one corresponding securing recess and/or at least one corresponding said securing projection on at least one annular front wall that faces toward one of said circular disks of said holder.

7. The pump according to claim 1, wherein said half-lens-shaped depression is formed in an annular front wall of said permanent magnet ring and said half-lens-shaped projection formed on said holder is formed on a circular disk wall, of said at least one circular disk, facing said permanent-magnet ring.

8. The pump according to claim 1, wherein said permanent-magnet ring is formed with at least one positioning notch configured to securely hold said permanent-magnet ring against rotation during a magnetization process in a magnetization apparatus.

9. The pump according to claim 1, wherein said permanent-magnet ring is formed with three or more positioning notches configured to securely hold said permanent-magnet ring against rotation during a magnetization process in a magnetization apparatus.

10. The pump according to claim 1, wherein said DC pump drive motor is a wet-running motor through which liquid passes and said permanent magnet ring is configured to be in direct contact with the liquid.

11. A domestic appliance, comprising a pump according to claim 1.

12. The domestic appliance according to claim 11 configured as a dishwasher or a washing machine.

* * * * *